United States Patent [19]

Masunaga

[11] Patent Number: 5,036,390
[45] Date of Patent: Jul. 30, 1991

[54] IMAGE COMMUNICATION APPARATUS

[75] Inventor: Makoto Masunaga, Tokyo, Japan

[73] Assignee: Canon Kabushiki Kaisha, Tokyo, Japan

[21] Appl. No.: 398,938

[22] Filed: Aug. 28, 1989

[30] Foreign Application Priority Data

Aug. 30, 1988 [JP] Japan .................. 63-213716

[51] Int. Cl.[5] .................. H04N 7/14
[52] U.S. Cl. .................. 358/85; 379/53
[58] Field of Search .................. 358/85, 134, 54; 379/53

[56] References Cited

U.S. PATENT DOCUMENTS

| 3,842,199 | 10/1974 | Gibson | 379/100 |
| 4,485,400 | 11/1984 | Lemelson et al. | 379/53 |
| 4,654,484 | 3/1987 | Reiffel et al. | 379/53 |
| 4,703,348 | 10/1987 | Yuasa et al. | 358/85 |
| 4,715,059 | 12/1987 | Cooper-Hart et al. | 358/85 |
| 4,758,881 | 7/1988 | Laspada | 358/85 |
| 4,893,326 | 1/1990 | Duran et al. | 379/53 |
| 4,943,994 | 7/1990 | Ohtsuka et al. | 358/85 |

FOREIGN PATENT DOCUMENTS 0320828 6/1989 European Pat. Off. .......... 379/53

Primary Examiner—Jin F. Ng
Assistant Examiner—Stella L. Woo
Attorney, Agent, or Firm—Fitzpatrick, Cella, Harper & Scinto

[57] ABSTRACT

There is disclosed an apparatus for displaying an image taken with a camera or an image transmitted externally, in which the camera-taken image is displayed in laterally inverted manner as if the operator look at a mirror, thereby facilitating the monitoring operation, while the externally transmitted image is displayed without lateral inversion.

33 Claims, 6 Drawing Sheets

IMAGE COMMUNICATION APPARATUS

BACKGROUND OF THE INVENTION

1. Field of the Invention

The present invention relates to an image communication apparatus provided with a display unit for displaying an image.

2. Related Background Art

Recent progress in communication technology has realized, in addition to the conventional telephone apparatus for conversation only, a television telephone apparatus capable of taking the image of the user and transmitting the information of said image to another telephone unit.

In the conventional television telephone apparatus, the user can monitor, by looking at a display provided on the telephone apparatus, how the user is viewed by the television camera.

Conventionally, the television camera reads the image by scanning from top left position to bottom right position as shown in FIG. 7, and the display unit displays the image by scanning from top left position to bottom right position, corresponding to the entered image signal. Consequently, when the user takes himself with the television camera and monitors the image on the display, the image appears laterally inverted.

More specifically, an object 13, shown in FIG. 8A, taken with the television camera appears on the display unit as shown in FIG. 8B.

Such laterally inverted image appears quite unnatural, because the user is accustomed to his image in the mirror. If the user wishes to move the image 13A on the display unit in a direction a or b as shown in FIG. 8B, the user has to move respectively in a direction A or B in FIG. 8A. However, because of the usual habit in the mirror, the user tends to move in the direction B or A whereby the image 13A move respectively to the direction b or a, contrary to the intention of the user.

For this reason the proper positioning of the image 13A is quite difficult, and the operability of the apparatus has been far from satisfaction.

SUMMARY OF THE INVENTION

An object of the present invention is to provide an improvement in the image communication apparatus.

Another object of the present invention is to provide an image communication apparatus with satisfactory operability.

Still another object of the present invention is to provide an image communication apparatus capable, in case of monitoring the taken image of the user, of displaying said image in a manner as if seen in a mirror.

Still another object of the present invention is to provide an image transmitting apparatus capable of proper operations respectively in case of monitoring the taken image of the user and in case of transmitting the taken image of the user.

Still another object of the present invention is to provide an image receiving apparatus capable of proper controls respectively in case of monitoring the taken image of the user and of displaying a received image.

Still other objects of the present invention will become fully apparent from the following description of the embodiments thereof.

DETAILED DESCRIPTION OF THE PREFERRED EMBODIMENTS

In the following there will be explained an embodiment relating to a television telephone apparatus connectable to another telephone apparatus through a communication medium, and more particularly to a television telephone apparatus capable, in monitoring the image of the user taken with the television camera, of displaying a natural image as seen in a mirror, thereby improving the operability for example in adjusting the image angle of the transmitted image.

In the following said embodiment will be explained with reference to the attached drawings.

Figure 1:
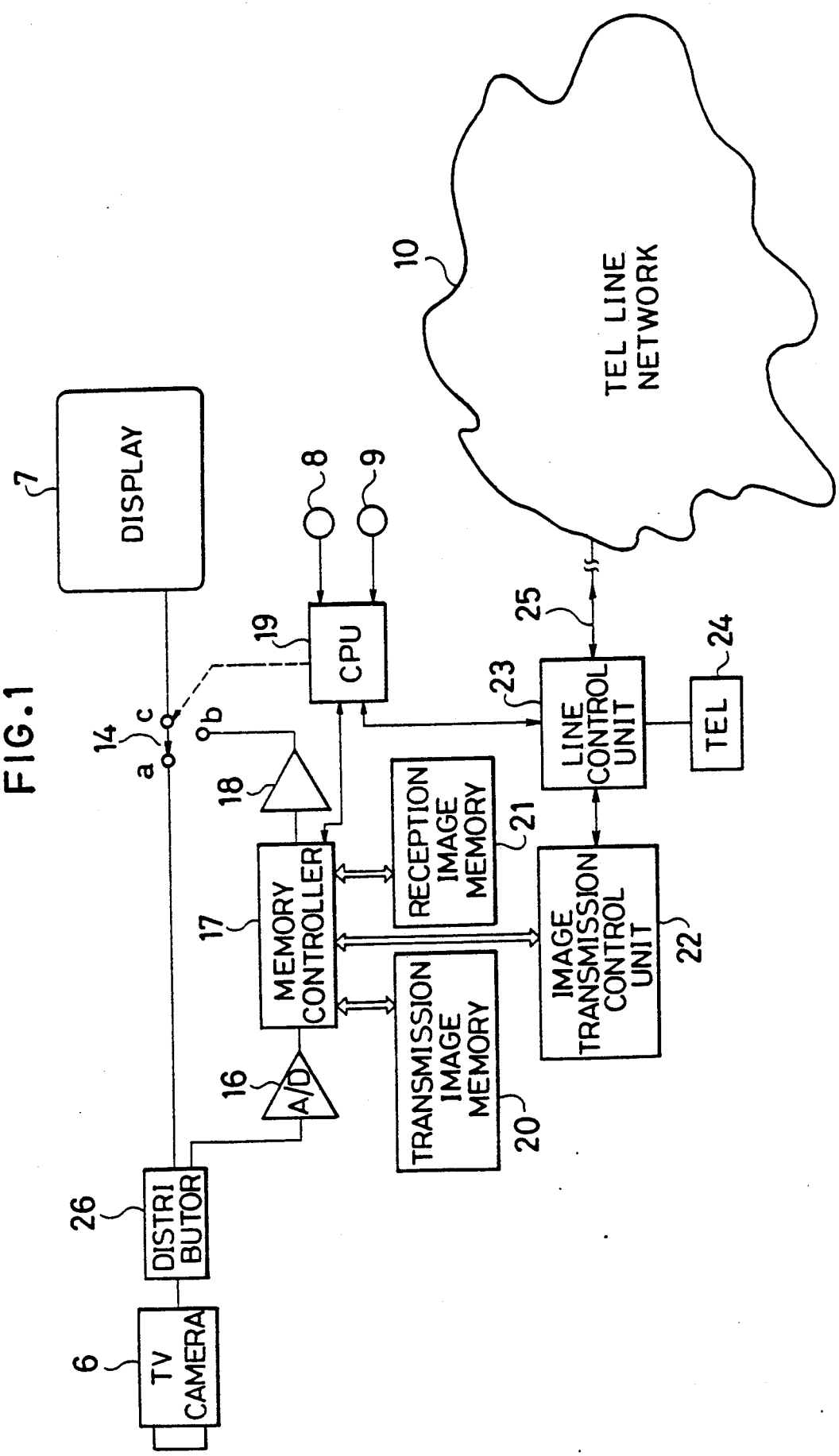
FIG. 1 is a block diagram of a television telephone apparatus embodying the present invention.

FIG. 1 is a block diagram of an embodiment of the present invention, wherein shown are a television camera (objective lens) 6 for taking the image for example of the user; a display unit (television monitor) 7 for displaying the image of the user taken by the television camera or the image transmitted from another telephone unit through a communicaiton channel; a monitor selector switch 14 for selectively sending an image signal supplied from the television camera 6 to a contact a through a distributor 26 or an image to be transmitted or a received image supplied from a transmission image memory 20 or a reception image memory 21 to said contact a through a D/A converter 18, to the display unit 7 through a contact c; An A/D converter 16 for converting analog image signal from the distributor 26 into corresponding digital signal; a memory controller 17 for controlling the image writing and readout in the transmission image memory 20 and the reception image memory 21; a D/A converter 18 for converting digital image signal, read from the transmission image memory 20 or the reception image memory 21 under the control by said memory controller 17, into corresponding analog signal; a central control unit (CPU) 19 for controlling the monitor selector switch 14, memory controller 17 and line control unit 23 in response to input signals for example from an image transmission button 8 and a monitor selector button 9 provided on the telephone unit 1; a transmission image memory 20 for storing the image to be transmitted in digital signals; a reception image memory 21 for storing the received image in digital signals; an image transmission control unit 22 for modulating, according to a predetermined communication protocol, the image read from the transmission image memory 20 under the control of the memory controller 17 and transmitting said image through a line control unit 23 to a communication line 25, and for demodulating the image, received from the communication line 25 through the line control unit 23 and storing said image in the reception image memory 21 under the control of the memory controller 17; a line control unit 23 functioning as an interface with the line 25; a telephone unit 24 for conversation and for sending telephone number for calling; a communication line 25 connected to a public telephone line network 10; and a distributor 26 for dividing the image signal taken by the television camera which is for taking the image of the user present in front of the main body 1.

Figure 2:
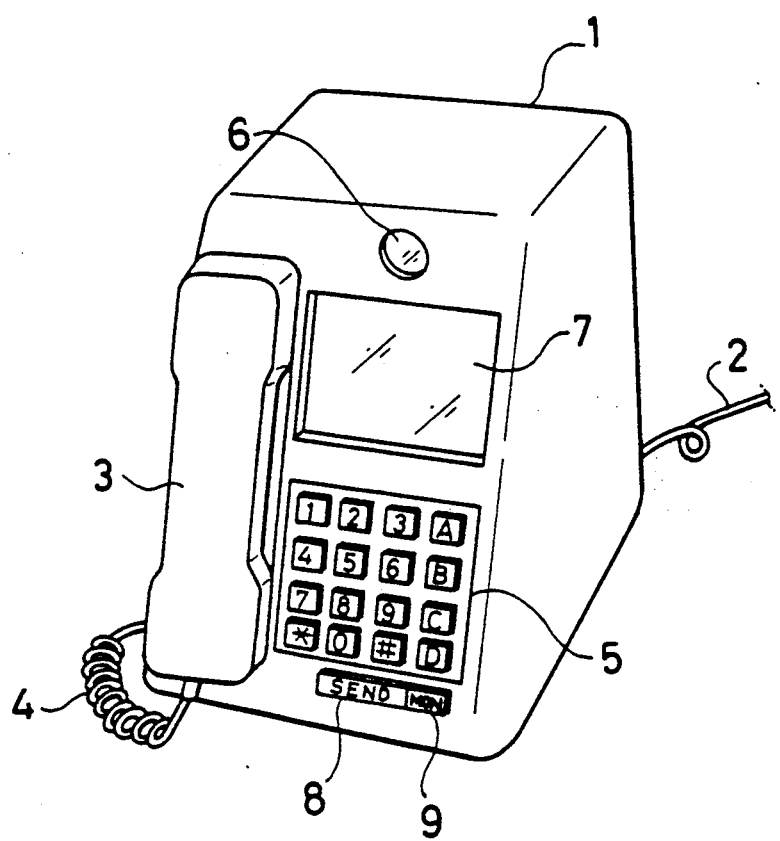
FIG. 2 is a perspective view of the television telephone apparatus of said embodiment.

FIG. 2 is a perspective view of the television telephone apparatus of the above-explained structure.

In FIG. 2 there are shown a main body 1 of a user 11A; a cable 2 for connecting the main body 1 of the telephone apparatus to the public telephone line network 10; a telephone handset 3; a spiral cord 4 connecting the handset 3 to the main body 1; telephone number buttons 5 for entering a telephone number etc.; a television camera (objective lens) 6 for taking the image of the user 11A; a display unit (television monitor) 7 for displaying the image of the user 11A taken by the television camera 6 or an image 11B transmitted through the communication line from another telephone unit; an image transmission button 8 for transmitting the image of the user 11A, taken by the television camera 6, to the telephone unit of destination; and a monitor selector button 9 for selecting the image to be displayed on the display unit 7, namely the image of the user 11A taken by the television camera 6 of this telephone unit or the received image 11B sent from the telephone unit of destination through the communication line. Another telephone unit 1B, at the side of the other user 11B, has the same structure as the telephone unit 1.

Figure 3:
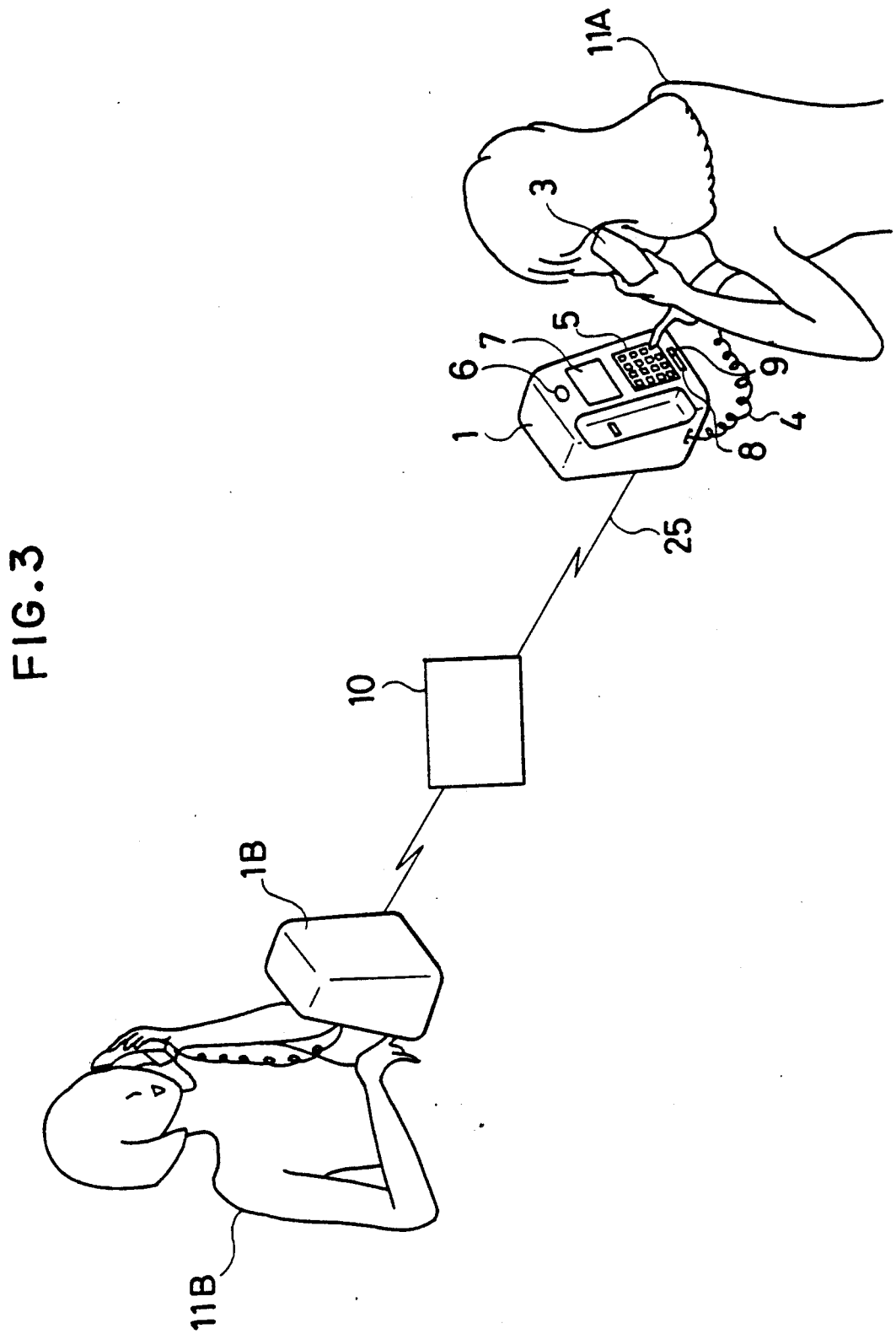
FIG. 3 is a schematic view showing the state of use of the apparatus of said embodiment.
Figure 4:
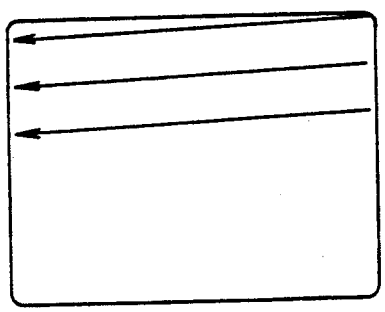
FIG. 4 is a schematic view showing the scanning method of the output signal of the television camera of said embodiment.

In the following there will be explained the communication control of the telephone apparatus of the above-explained embodiment, with reference to FIG. 3. In the following there will be considered a case in which the user 11A calls the user11B.

At first the user 11A makes a request for a call to the public telephone network 10, by lifting the handset 3 from the hook of the main body 1. After confirming the dialling tone sent from said network, the user 11A enters, with the buttons 5, the telephone number of the telephone unit of user 11B. The main body 1 releases telephone number signals (dial pulse signals or DTMF signals) corresponding to the actuated buttons. The exchange equipment of said network 10 receives said number signals and calls the telephone unit of destination specified by said telephone number signals, whereby the bell of the telephone unit 11B of destination is activated. The other user recognizes the call by the bell sound, and responds to the call by lifting the handset from the hook of the telephone unit 1B. The exchange equipment of the public telephone network 10 detects said response, and forms a communication channel between both telephone units, thereby enabling communication.

On the other hand, upon detection of lifting of the handset 3, the main body 1 starts power supply to an image transmission/reception circuit including the television camera 6 and the display unit 7, thereby enabling the transmission and reception image. In this state the television camera takes the image 11A of the user present in front of the television camera 6.

In this state, the selector switch 14 is connected to the contact a as shown in FIG. 1, whereby the face of the user 11A, taken by the television camera 6, is displayed as a moving image on the display unit 7, through the distributor 26 and the monitor selector switch 14.

Figure 6A:
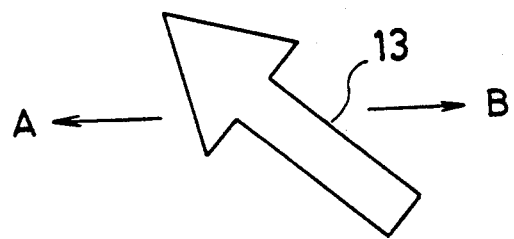
FIGS. 6A and 6B are schematic views of display image on the display unit of said embodiment.
Figure 6B:
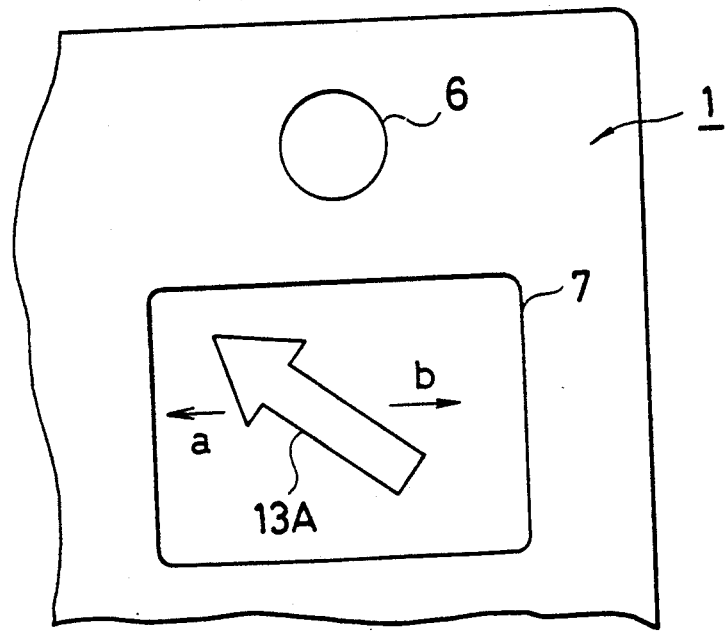
Figure 7:
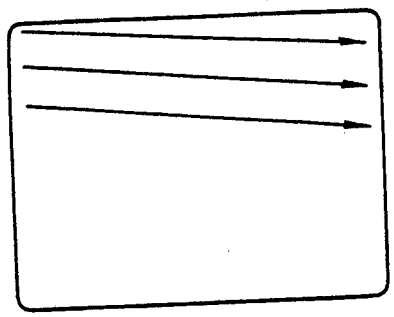
FIG. 7 is a schematic view of the usual scanning method of the television signal.
Figure 8A:
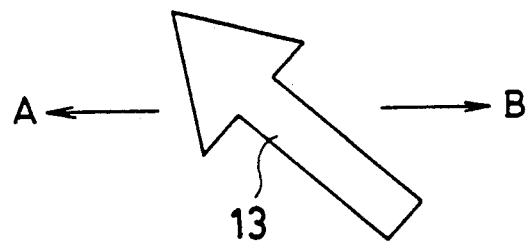
FIGS. 8A and 8B are schematic views of the displayed image on the display unit of a conventional television telephone apparatus.
Figure 8B:
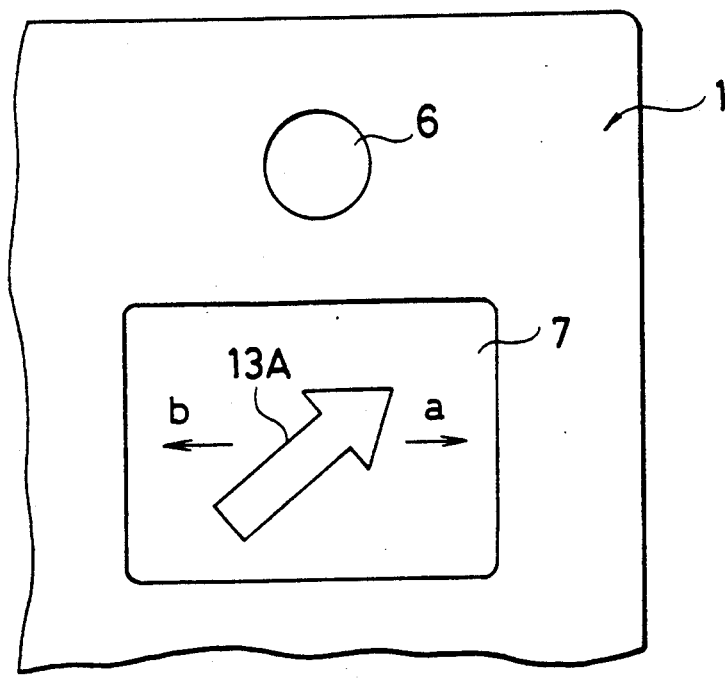

In contrast to the usual television camera in which signal scanning is conducted from top left to bottom right as shown in FIG. 7, the television camera of the present embodiment effects the scanning, in this state, from top right to bottom left. Consequently, if the image signal from the television camera 6 of the present embodiment is displayed on the display unit 7 of the ordinary scanning method from top left to bottom right, there is obtained a mirror image which is inverted in the lateral direction. Therefore, from an object 13 shown in FIG. 6A, there is obtained a mirror-inverted image 13A as shown in FIG. 6B, on the display unit 7.

Stated differently, when the object 13 shown in FIG. 6A is taken by the television camera, the image 13A on the display unit 7 is, as shown in FIG. 6B, in a mirror image relationship to the user.

When the image 13A of the object on the display unit 7 is to be moved in a direction a, the user 13 who is the object has to move in a direction A. Since said direction A is same as the direction a on the display unit 7, and the positioning of the image 13A of the object can be made in a very natural manner. Also in case the image 13A is to be moved in a direction b, the object 13 or the user can move in the same direction B.

In addition to the case of movement of the user himself explained above, a similar effect can be obtained also in case of regulating the television camera 6 to a suitable angle.

When the user 11A confirms the image taken and displayed on the display unit 7 and identifies that his displayed image is suitable for transmission, he depresses the monitor selector button 9.

In response the monitor selector switch 14 is shifted to the contact b, whereby the display unit 7 receives the signal from the D/A converter 18.

On the other hand, the image signal from the television camera 6 is supplied from the distributor 6 to the A/D converter 16 for A/D conversion, further transferred to the memory controller 17 and stored in the transmission image memory 20 under the control of said memory controller 17.

Figure 5:
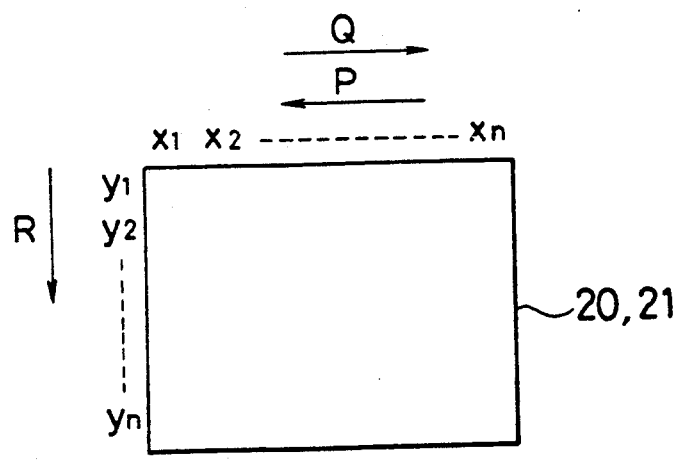
FIG. 5 is a view showing control for the writing and readout control of image data to or from the memory in said embodiment.

In the following there will be explained the control sequence of the memory controller 17, with reference to FIG. 5.

In response to the depression of the monitor selector button 9, the memory controller 17 stores the image signal from the television camera 6 in the transmission image memory 20, in the order of $x_1, x_2, ..., x_n$ in a direction Q in the horizontal direction (main scanning direction), and in the order of $y_1, y_2, ..., y_n$ in a direction R in the vertical (sub scanning) direction.

The image stored in the transmission image memory 20 is read in the same order as in the recording under the control by the memory controller 17, converted into corresponding analog image signal by the D/A converter 18, and supplied to the monitor selector switch 14.

Thus the image signal to be transmitted is supplied from the D/A converter 18 to the display unit 7 through the monitor selector switch 14, whereby the image to be transmitted is displayed as a still image on the display unit 7. Thus the user can confirm his image to be transmitted. The displayed image in this case is laterally inverted as in case of the image from the television camera 6 and looks like a mirror image.

When the user 11A confirms the image taken in the above-explained procedure and displayed on the display unit 7, and identifies that his displayed image is suitable for transmission, he instructs the transmission of the image data by depressing the image transmission button 8.

In this case, the image data stored in the transmission image memory 20 are read in an order determined by the transmission protocol under the control of the memory controller 17, and are supplied to the image transmission control unit 22. At the same time the image data are converted into corresponding to analog image signals by the D/A converter 18 and supplied to the monitor selector switch 14. The image signal supplied to the image transmission control unit 22 is modulated according to a predetermined format, and is sent to the communication line 25 through the line control unit 23.

When the memory controller 17 reads the transmission image signal from the transmission image memory 20 in response to said instruction for transmission, said signal readout is conducted in such a manner that the pixels are inverted in the horizontal direction.

For example, in the image handling in a conventional protocol, and if the television camera 6 is of the ordinary scanning method, the pixels can be read in an order of $x_1, x_2, ..., x_n$ in a direction Q in the horizontal direction, and in the order of $y_1, y_2, ..., y_n$ in a vertical direction R. However, in the present embodiment, since the television camera is of the inverse scanning method, the memory controller 17 reads the pixels in the order of $x_n, ..., x_2, x_1$ in the inverse horizontal direction P and in the order of $y_1, y_2, ..., y_n$ in the horizontal direction R, and sends the obtained signals to the image transmission control unit 22. Thus the image to be transmitted has a normal lateral order and is sent to the communication line 25 through the line control unit 23.

At the same time the transmitted image data are displayed as a still image on the display unit 7, in order to enable the user 11A to confirm the transmitted or received data.

In the other telephone set 1B of the user 11B receiving the image data from the user 11A, the received image data are stored in the memory 21 and displayed on the display unit 7. In this case the received signal from the line 25 is sent through the line control unit 23 to the image transmission control unit 22, then received according to the transmission protocol and converted by a predetermined demodulation into corresponding image signal, which is supplied to the memory controller 17 and stored in the reception image memory 21.

The memory controller 17 stores the received pixels in the reception image memory 21 in the order of $x_1, x_2, ..., x_n$ in a horizontal direction Q and in the order of $y_1, y_2, ..., y_n$ in a vertical direction R.

When the monitoring of the received image is instructed by the monitor selector button 9, the memory controller 17 reads the pixels from the reception image memory 21 in the order of $x_1, x_2, ..., x_n$ in a horizontal direction Q and in the order of $y_1, y_2, ..., y_n$ in a vertical direction R. Said pixel data are converted by the D/A converter 18 into corresponding analog image signal, which is supplied to the monitor selector switch 14. The received image signal from the D/A converter 18 is supplied to the display unit 7 through the monitor selector switch 14, whereby the face of the other user is displayed as a still image. Said image appears in laterally normal manner on the display unit 7.

If the user 11B wishes to monitor the image from the television camera 6, said image is guided through the distributor 26 and the monitor selector switch 14, and the mirror-inverted signal is supplied to the display unit 7. On the other hand, in case of monitoring the image of the transmission image memory 20, the image is read in the order of $x_1, x_2, ..., x_n$ in the horizontal direction R and in the order of $y_1, y_2, ..., y_n$ in the vertical direction Q, and the mirror-inverted image signal is supplied to the display unit 7 through the memory controller 17, D/A converter 18 and monitor selector switch 14.

As explained in the foregoing, the user can monitor, on the display unit, his image as a laterally inverted mirror image, or the image received from the other user as a laterally normal image.

Through the operation explained above, the image of the user 11A is displayed on the display unit 7 of the telephone apparatus 1 of the user 11B, whereby the user 11B can make conversation, while watching the image of the user 11A.

Similarly the image taken at the side of the user 11B can be transmitted to the side of the user 11A, whereby the users A and B can mutually communicate while watching each other's image.

In the foregoing embodiment there is employed a television camera 6 capable of releasing laterally inverted image signal, but it is also possible to employ a television camera releasing conventional image signal which is laterally normal, and, in the image monitoring on the display unit 7, to store the signal in the transmission image memory 20 or another memory, thereby laterally inverting the image at the signal readout from said memory.

Also there may be employed a display unit 7 which laterally inverts the image. In such case, a laterally normal received image can be obtained by laterally inverting the signal at the image readout from the reception image memory 21.

Furthermore, there may be employed a display unit 7 capable of selecting either a laterally normal display or a laterally inverted display. In such case, desired displays can be obtained by said selection in the monitoring of the image of the user and the display of the received image.

Thus there is provided a television telephone apparatus capable of a natural image as in a mirror, when the user looks at his image, taken with the television camera, on the monitor thereby improving the operability such as the image angle adjustment of the image to be transmitted.

As explained in the foregoing, the present embodiment enables the user to look at his own image, taken by the television camera and displayed on the display unit on the telephone unit, as a natural mirror image, so that the user can adjust his position easily as in the case of image reflected in the ordinary mirror. Thus there is obtained a television telephone apparatus allowing easy positioning and providing improved operability.

Though the present invention has been explained an embodiment thereof, it is not limited to such embodiment and is subjected to various modifications within the scope and spirit of the appended claims.

What is claimed is:

1. An image transmission apparatus comprising:

generation means for continuously generating a laterally inverted source image signal by photoelectrically converting a source image;

display means for displaying the source image with keeping a laterally inverted state of the source image, on the basis of the source image signal, said display means being adapted to renew the display according to the source image continuously generated by said generation means; and transmission means for executing an image transmission by further laterally inverting the laterally inverted source image.

2. An image transmission apparatus according to claim 1, wherein said generation means comprises a television camera.

3. An image transmission apparatus according to claim 1, wherein said transmission means is adapted to transmit an image to a communication line.

4. An apparatus according to claim 1, wherein an image displaying direction of said display means is a standard direction, and an image generating direction of said direction means is a laterally inverted direction of the standard direction.

5. An apparatus according to claim 1, wherein said generation means generates the source image signal by scanning the source image in an inverted direction of a standard direction, and said display means displays the source image by scanning a display medium in the standard direction.

6. An apparatus according to claim 1, wherein said transmission means further comprises memory means for storing therein the laterally inverted source image signal, and said transmission means reads the image signal from said memory means such that the laterally inverted source image is laterally inverted.

7. An image reception apparatus comprising:
image pickup means for picking up a source image;
reception means for receiving a reception image;
and display means for displaying the source image laterally inverted and the reception image not laterally inverted, wherein said reception means further comprises memory means for storing therein the reception image, said reception means transfers the reception image from said memory means to said display means such that a display of the reception image is not laterally inverted, an image pickup direction of said image pickup means is a laterally inverted direction of an image displaying direction of said display means, and said image pickup means transfers the source image to said display means without passing the source image through said memory means.

8. An apparatus according to claim 7, wherein said image pickup means is adapted to continuously pick up the source image, and said display means is adapted to renew the display according to the image continuously picked up by said image pickup mean.

9. An image reception apparatus according to claim 7, wherein said reception means is adapted to receive an image from a communication line.

10. An apparatus according to claim 7, wherein an image displaying direction of said display means is a standard direction, and an image pickup direction of said image pickup means is a laterally inverted direction of the standard direction.

11. An apparatus according to claim 7, wherein an image pickup direction of said image pickup means is a standard direction, and an image displaying direction of said display means is a laterally inverted direction of the standard direction.

12. An apparatus according to claim 11, wherein said reception means reads the reception image from said memory means with laterally inverting the reception image.

13. An apparatus according to claim 7, wherein said image pickup means includes a television camera.

14. An apparatus according to claim 7, wherein said image pickup means picks up the source image by scanning the source image, said display means displays the image by scanning a display medium, and a scan direction of said image pickup means is a laterally inverted direction of a scan direction of said display means.

15. An image reception apparatus comprising:
image pickup means for generating a source image signal by picking up a source image;

reception means for receiving a reception iamge signal representing a reception image; and display means for displaying a laterally inverted image on the basis of the image signal provided from said image pickup means and said reception means, wherein said reception means further comprises memory means for storing therein the reception image signal, said reception means reads the image signal such that the reception image is laterally inverted, and said reception means provides the read image signal to said display means, and said image pickup means provides the reception image signal to said display means without passing the reception image signal through said memory means.

16. An apparatus according to claim 15, wherein said image pickup means includes a television camera.

17. An apparatus according to claim 15, wherein said reception means receives the reception image signal over a communication line.

18. An apparatus according to claim 15, wherein said display means displays the laterally inverted image by scanning a display medium in an inverted direction of a standard direction.

19. An image transmission apparatus comprising:
generation means for generating an analog source image signal by photoelectrically converting an image;

transmission means for transmitting the image on the basis of the analog source image signal, wherein said transmission means further comprises digitizing means for digitizing the analog source image signal and executes a transmission process according to the digitized source image signal such that the image is not inverted; and display means for displaying the laterally inverted image, in accordance with the analog source image signal which is not yet digitized by said digitizing means.

20. An apparatus according to claim 19, wherein said generation means includes a television camera.

21. An apparatus according to claim 19, wherein said transmission means transmits the image over a communication line.

22. An apparatus according to claim 19, wherein said transmission means transmits the image by modulating the image according to the digitized source image signal.

23. An apparatus according to claim 19, wherein said generation means generates the analog source image signal by scanning the image,
said display means displays the image by scanning a display medium, and
a scan direction of said generation means is a laterally inverted direction of a scan direction of said display means.

24. An apparatus according to claim 23, wherein said generation means scans the image in a standard direction, and
said display means scans the display medium in a laterally inverted direction of the standard direction.

25. An apparatus according to claim 23, wherein said display means scans the display medium in a standard direction, and
said generation means scans the image in a laterally inverted direction of the standard direction.

26. An apparatus according to claim 23, wherein said transmission means further comprises memory means for storing therein the digitized source image signal, and
the signal is read from said transmission means such that the image is laterally inverted.

27. An image transmission apparatus comprising:
generation means for generating a source image signal by photoelectrically converting a source iamge;
display means for displaying the laterally inverted source image; and
transmission means for transmitting the source image signal such that the source image is not laterally inverted,
wherein said transmission means further comprises memory means for storing therein the source image signal according to a key operation by an operator,
said transmission means transmits the source image signal read from said memory means, and
said display means receives the source image signal from said generation means without passing the source image signal through said memory means.

28. An apparatus according to claim 27, wherein said generation means includes a television camera.

29. An apparatus according to claim 27, wherein said generation means generates the image signal by scanning the source image,
said display means displays the source image by scanning a display medium, and
a scan direction of said generation means is a laterally inverted direction of a scan direction of said display means.

30. An apparatus according to claim 27, wherein said generation means scans the image in a standard direction, and
said display means scans the display medium in a laterally inverted direction of the standard direction.

31. An apparatus according to claim 27, wherein said display means scans the display medium in a standard direction, and
said generation means scans the image in a laterally inverted direction of the standard direction.

32. An apparatus according to claim 27, where said transmission means further comprises memory means for storing therein the digitize source image signal, and
the signal is read from said transmission means such that the image is laterally inverted.

33. An apparatus according to claim 27, wherein said transmission means transmits the image over a communication line.

* * * * *

UNITED STATES PATENT AND TRADEMARK OFFICE
CERTIFICATE OF CORRECTION

PATENT NO. : 5,036,390
DATED : July 30, 1991
INVENTOR(S) : MAKOTO MASUNAGA

It is certified that error appears in the above-identified patent and that said Letters Patent is hereby corrected as shown below:

Col. 3, line 54, "telephone unit 11B" should read --telephone unit 1B--.

Col. 4, line 42, "distributor 6" should read --distributor 26--.

Col. 7, line 22, "direction means" should read --generation means--.
      line 62, "image pickup mean" should read --image pickup means--.

Signed and Sealed this

Nineteenth Day of January, 1993

Attest:

DOUGLAS B. COMER

*Attesting Officer*     Acting Commissioner of Patents and Trademarks